(12) United States Patent
Zhou et al.

(10) Patent No.: US 9,374,311 B1
(45) Date of Patent: Jun. 21, 2016

(54) SYSTEM AND METHOD FOR REDUCING HARDWARE TABLE RESOURCES IN A MULTI-STAGE NETWORK DEVICE

(71) Applicant: Google Inc., Mountain View, CA (US)

(72) Inventors: Junlan Zhou, Sunnyvale, CA (US); Amin Vahdat, Los Altos, CA (US); Arjun Singh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/732,116

(22) Filed: Jun. 5, 2015

Related U.S. Application Data

(60) Continuation of application No. 14/244,367, filed on Apr. 3, 2014, now Pat. No. 9,083,626, which is a division of application No. 13/358,848, filed on Jan. 26, 2012, now Pat. No. 8,737,269.

(51) Int. Cl.
*H04L 12/26* (2006.01)
*H04L 12/803* (2013.01)
*H04L 12/933* (2013.01)
*H04L 12/947* (2013.01)
*H04L 12/707* (2013.01)

(52) U.S. Cl.
CPC .............. *H04L 47/125* (2013.01); *H04L 45/24* (2013.01); *H04L 49/1507* (2013.01); *H04L 49/25* (2013.01)

(58) Field of Classification Search
CPC .. H04L 47/125; H04L 49/1507; H04L 49/125
USPC .......................................................... 370/235
See application file for complete search history.

(56) References Cited

U.S. PATENT DOCUMENTS

| | | | |
|---|---|---|---|
| 7,898,959 B1* | 3/2011 | Arad | H04L 45/00 370/235 |
| 2003/0142668 A1* | 7/2003 | Wyatt | H04Q 3/68 370/389 |
| 2007/0253426 A1* | 11/2007 | Herring | H04L 12/18 370/395.7 |
| 2010/0135286 A1* | 6/2010 | Konda | H04Q 3/68 370/388 |

* cited by examiner

*Primary Examiner* — Sai-Ming Chan
(74) *Attorney, Agent, or Firm* — Lerner, David, Littenberg, Krumholz & Mentlik, LLP

(57) ABSTRACT

A multi-stage network is provided, where the network includes a first stage comprising a first plurality of network switching devices, the first plurality of network devices being classified into switching groups. The network further includes a second stage comprising a second plurality of network switching devices. A linking configuration, comprising a plurality of links between the first plurality of network switching devices and the second plurality of network switching devices, couples the first stage to the second stage. Each first stage network switching device in a given switching group includes the same number of links to any given second stage network switching device as each other first stage network switching device in that group.

20 Claims, 9 Drawing Sheets

SYSTEM AND METHOD FOR REDUCING HARDWARE TABLE RESOURCES IN A MULTI-STAGE NETWORK DEVICE

CROSS-REFERENCE TO RELATED APPLICATIONS

The present application is a continuation of U.S. patent application Ser. No. 14/244,367, filed on Apr. 3, 2014, which is a divisional of U.S. patent application Ser. No. 13/358,848, filed on Jan. 26, 2012, the disclosure of which is incorporated herein by reference.

BACKGROUND OF THE INVENTION

Data center networking fabric costs are largely based on box to box interconnects and by the cost of the intelligent switching components that form the switching elements that build up the fabric. The presently favored approach to building data centers is by using the Clos architecture, which is targeted at supporting fully connected non-blocking fabric. However, fabrics built utilizing the Clos architecture can be costly in terms of both chip count and scalability quantization costs, and lead to stranding of bandwidth and hence cost to the user. More recent architectures such as flattened butterfly and Dragonfly have emerged as alternative lower-cost architectures but suffer from performance issues and complexity in other areas such as oversubscription and manageability.

SUMMARY OF THE INVENTION

One aspect of the technology provides a multi-stage network, comprising a first stage comprising a first plurality of switches, a second stage comprising a second plurality of switches, and a predetermined number of links between each of the switches in the first stage and each of the switches in the second stage. A first number of links may connect a first switch in the first stage and a first switch in second stage, and may not be equal to a second number of links connecting the first switch in the first stage and a second switch in the second stage. Moreover, at least one second switch in the first stage may also have the first number of links to the first switch in the second stage and the second number of links to the second switch in the second stage. Host devices may be coupled to the first switch in the first stage and the at least one second switch in the first stage, wherein the host devices frequently communicate with each other through the first switch in the first stage and the at least one second switch in the second stage. Each of the first plurality of switches may include a forwarding table, and the forwarding table may include entries for performing weighted cost multi-path (WCMP) flow distribution. The forwarding table may comprise entries corresponding to one or more WCMP groups, the one or more WCMP groups comprising weights assigned to egress ports of a first stage switch for distribution of data to the plurality of second stage switches.

Another aspect of the technology provides a method of building a network, comprising providing a plurality of first tier switches in a first tier, each of the first tier switches having a plurality of egress ports, and providing a plurality of second tier switches arranged hierarchically above the plurality of first tier switches. For a given one of the plurality of first tier switches, a proposed linking configuration to each of the plurality of second tier switches may be determined, wherein the linking configuration is based at least in part on the number of egress ports in the given first tier switch and the number of second tier switches. It may further be determined how many other first tier switches may be linked to each of the second tier switches using the proposed linking configuration, and the given first tier switch and the determined number of other first tier switches may be linked to the second tier switches using the proposed linking configuration. According to some aspects, a number of switch groups in the first tier may also be determined, each switch group comprising member first tier switches having the same linking configuration to the second tier switches as each other member in the switch group. Further, the given first tier switch may be configured to include a number of WCMP groups for transmission of flows destined for first tier switches outside its switch group, wherein the number of WCMP groups equals the number of switch groups minus 1.

Yet another aspect of the technology provides a multi-stage network, comprising a first stage comprising a first plurality of network switching devices, the first plurality of network devices being classified into switching groups. The network may further comprise a second stage comprising a second plurality of network switching devices, and a linking configuration comprising a plurality of links between the first plurality of network switching devices and the second plurality of network switching devices, wherein each first stage network switching device in a given switching group includes the same number of links to any given second stage network switching device as each other first stage network switching device in that group.

DETAILED DESCRIPTION

The present technology provides systems and methods for delivering substantially uniform performance to all hosts in a network. For example, in a multi-stage network having a plurality of switches in a first tier and a plurality of switches in a second tier, linking configurations may be determined to provide similar striping for two or more switches. For example, switches coupled to host devices that frequently communicate as source-destination pairs may be linked to second tier switches in a similar configuration. Therefore, even if uneven striping occurs, the source-destination pair may experience reduced congestion as a result of bandwidths therebetween.

Figure 1:
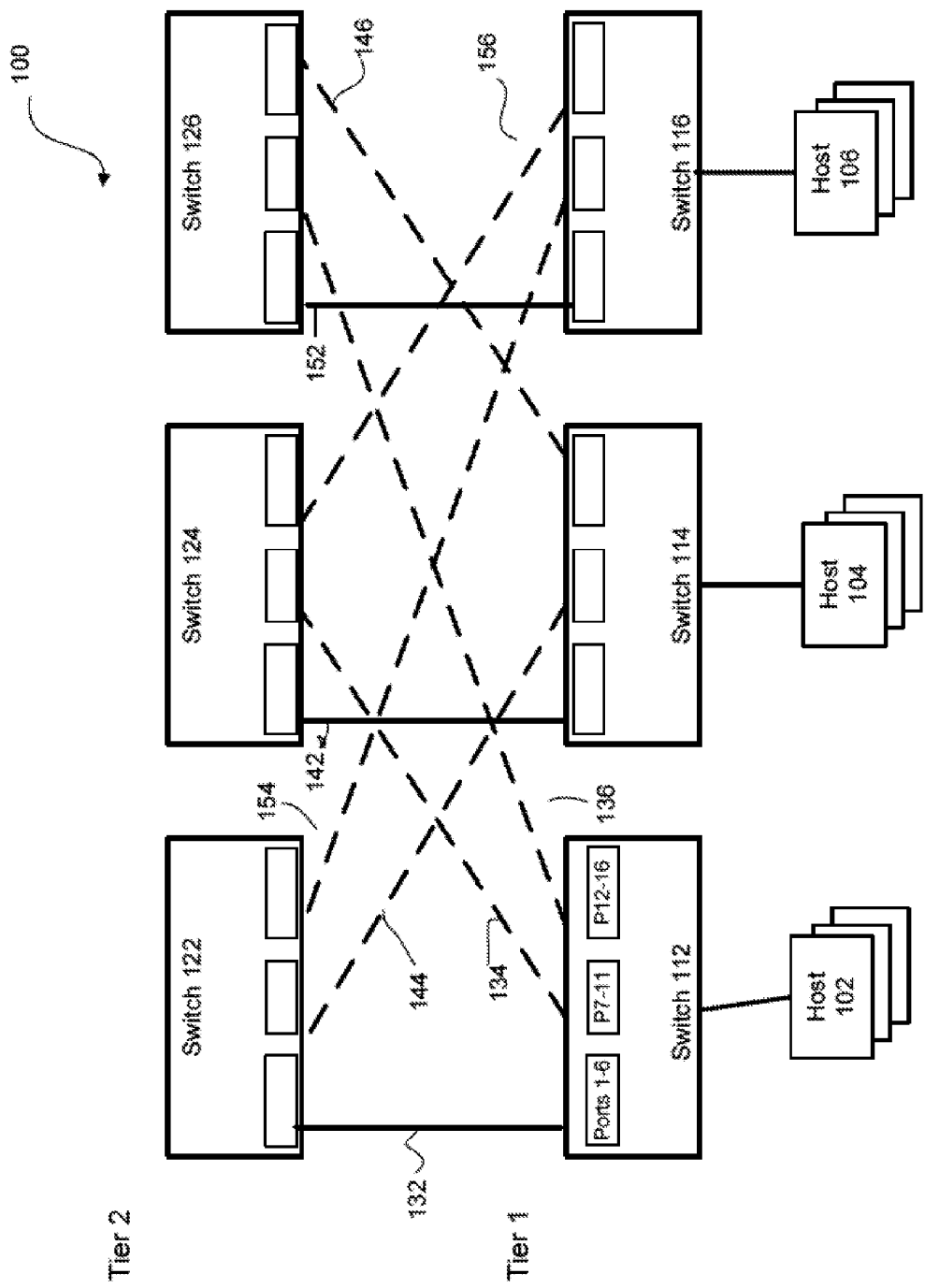
FIG. 1 is a schematic diagram of a multi-stage network according to aspects of the technology.

FIG. 1 illustrates a multi-stage network 100 according to aspects of the technology. As shown, the network comprises a first stage (Tier 1) including a first plurality of switches 112, 114, 116, and a second stage (Tier 2) including a second plurality of switches 122, 124, 126. While only a few switches 112-116, 122-126 are shown, it should be understood that the network 100 may be expanded to include any number of switches, for example, to accommodate greater amounts of network traffic. Each of the Tier 1 switches 112-116 may be coupled to one or more host devices 102, 104, 106, such as network servers or other computing devices. Each Tier 1 switch 112-116 may further be coupled to one or more of the Tier 2 switches 122-126. For example, each Tier 1 switch 112-116 may be coupled to each Tier 2 switch 122-126.

Each switch 112-116 and 122-126 may include a predetermined number of data ports. The number of data ports may vary depending on, for example, a type of switch used and may be proportional to a cost of the switch. Some ports may be dedicated to downlink traffic (e.g., from Tier 2 switches to Tier 1 switches, or from Tier 1 switches to host devices), while others may be dedicated to uplink traffic (e.g., from Tier 1 switches to Tier 2 switches, or from Tier 2 switches to other network devices). Alternatively or additionally, some ports may be dedicated to ingress while others are dedicated to egress. The number of data ports may also dictate the number of links that may be established with other network devices. For example, Tier 1 switch 112 may have 16 data ports for uplink traffic, and thus 16 links may be established between the switch 112 and the Tier 2 switches 122-126. Because there are three Tier 2 switches 122-126, and because does not divide equally by 3, there may be an uneven distribution of links among the switches 122-126 (e.g., uneven striping). For example, the connection 132 between the switch 112 and the switch 122 may comprise 6 links (e.g., coupled to ports 1-6 of the switch 112), while the connections 134, 136 between the switch 112 and each of the switches 124, 126 may comprise 5 links (e.g., coupled to ports 7-11 and ports 12-16, respectively, of the switch 112). While using ECMP flow distribution in such an environment with uneven striping may cause problems (e.g., oversubscription), weighting the flows using WCMP flow distribution may provide improved load balancing.

Figure 2:
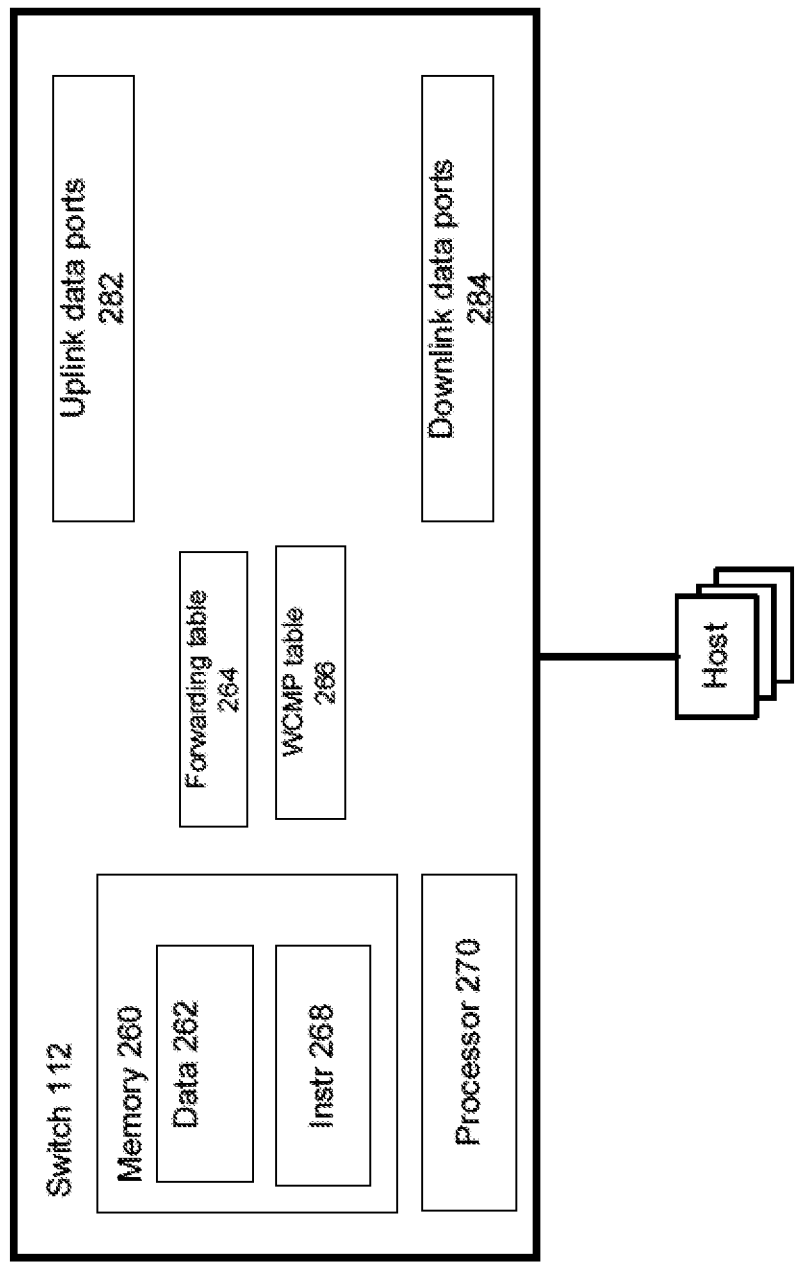
FIG. 2 is a block diagram of a switch according to aspects of the technology.

The Tier 1 switches 112-116 and the Tier 2 switches 122-126 may be routers, chips, or any other type of device capable of receiving packets at a first port and transmitting the packets through a second port. FIG. 2 illustrates an example of a switch, such as the switch 112. The switch 112 may comprise a memory 260, including data 262 and instructions 268, and a processor 270 coupled to the memory 260. The switch 112 may further comprise a number of data ports, such as uplink data ports 282 and downlink data ports 284.

The switch 112 may also include one or more forwarding tables 264 and WCMP tables 266. For example, the forwarding tables 264 may include a number of entries, each listing a key and an action. As packets are received by the switch 112, header information in those packets may be matched against the keys of the forwarding table to determine a corresponding action (e.g., a next hop). The WCMP table may, for example, include a weighting of each of the uplink data ports 282 on the switch 112, and may be used to determine which port (e.g., which uplink data port 282) the packet should be transmitted through. While the forwarding table 264 and WCMP table 266 are shown as being stored separately from the memory 260, it should be understood that the forwarding table 264, WCMP table 266, data 262, and instructions 268 may all be stored in the same medium.

The memory 260 stores information accessible by processor 270, including instructions 268, and data 262 that may be executed or otherwise used by the processor 270. The memory 260 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 268 may be any set of instructions to be executed directly (such as machine code) or indirectly (such as scripts) by the processor 270. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 262 may be retrieved, stored or modified by processor 270 in accordance with the instructions 268. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 270 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

While the components of the switch 112 have been described with respect to a particular Tier 1 switch, it should be understood that a similar architecture may be imparted to any of the other Tier 1 switches of any of the Tier 2 switches. According to one aspect, while the same switches may be used for Tier 1 and Tier 2, these switches may be configured differently. According to another aspect, the Tier 2 switches may differ from the Tier 1 switches, for example, with respect to the included number of data ports.

Figure 3:
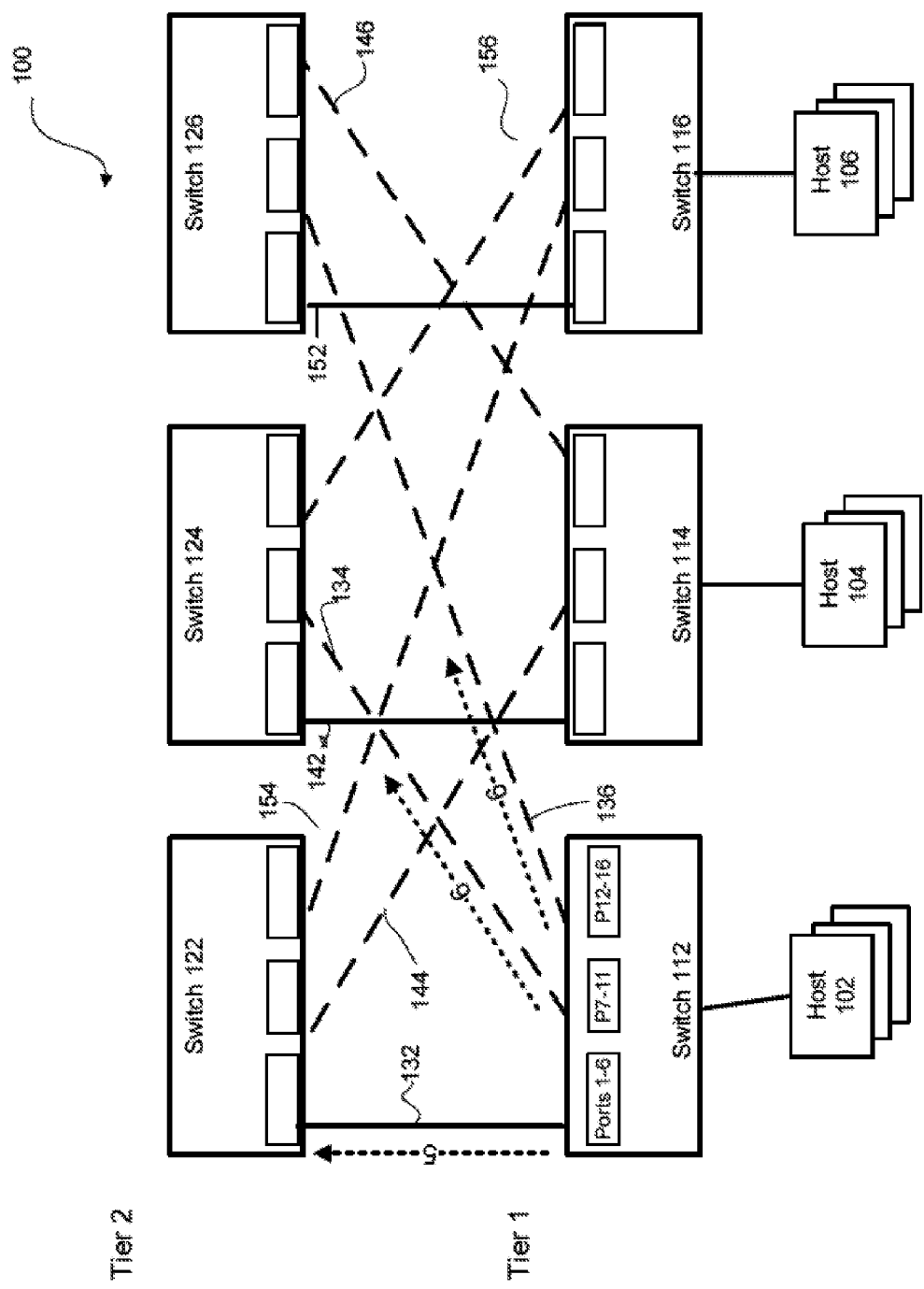
FIG. 3 is an illustration of an example of flow distribution according to aspects of the technology.

FIG. 3 illustrates an example of WCMP flow distribution according to aspects of the technology. As explained above with respect to FIG. 1, the connection 132 between the switch 112 and the switch 122 may comprise 6 links (e.g., in a bundle), while the connections 134 and 136 from the switch 112 to the switches 124 and 126, respectively, may each comprise 5 links. Similarly, the connection 152 between the switch 116 and the switch 126 may comprise 6 links, while the connections 154 and 156 to the switches 122 and 124 may each comprise 5 links. This may cause congestion in an ECMP flow distribution, because, for example, uplink traffic from the switch 112 to the switch 122 may be transmitted at a higher bandwidth than the downlink traffic from the switch 122 to the switch 116. However, using WCMP flow distribution ameliorates this problem.

As shown, the connection 132 may be given a weight of 5, while the connections 134 and 136 are each given a weight of 6. Thus, for example, for each 5 flows transmitted over each of the links in connection 132, 6 flows are transmitted over each of the links in connection 134 and 6 flows are transmitted over each of the links in connection 136. In this regard, the Tier 2 switch 122 will not become oversubscribed, and therefore is less likely to drop packets.

Figure 4:
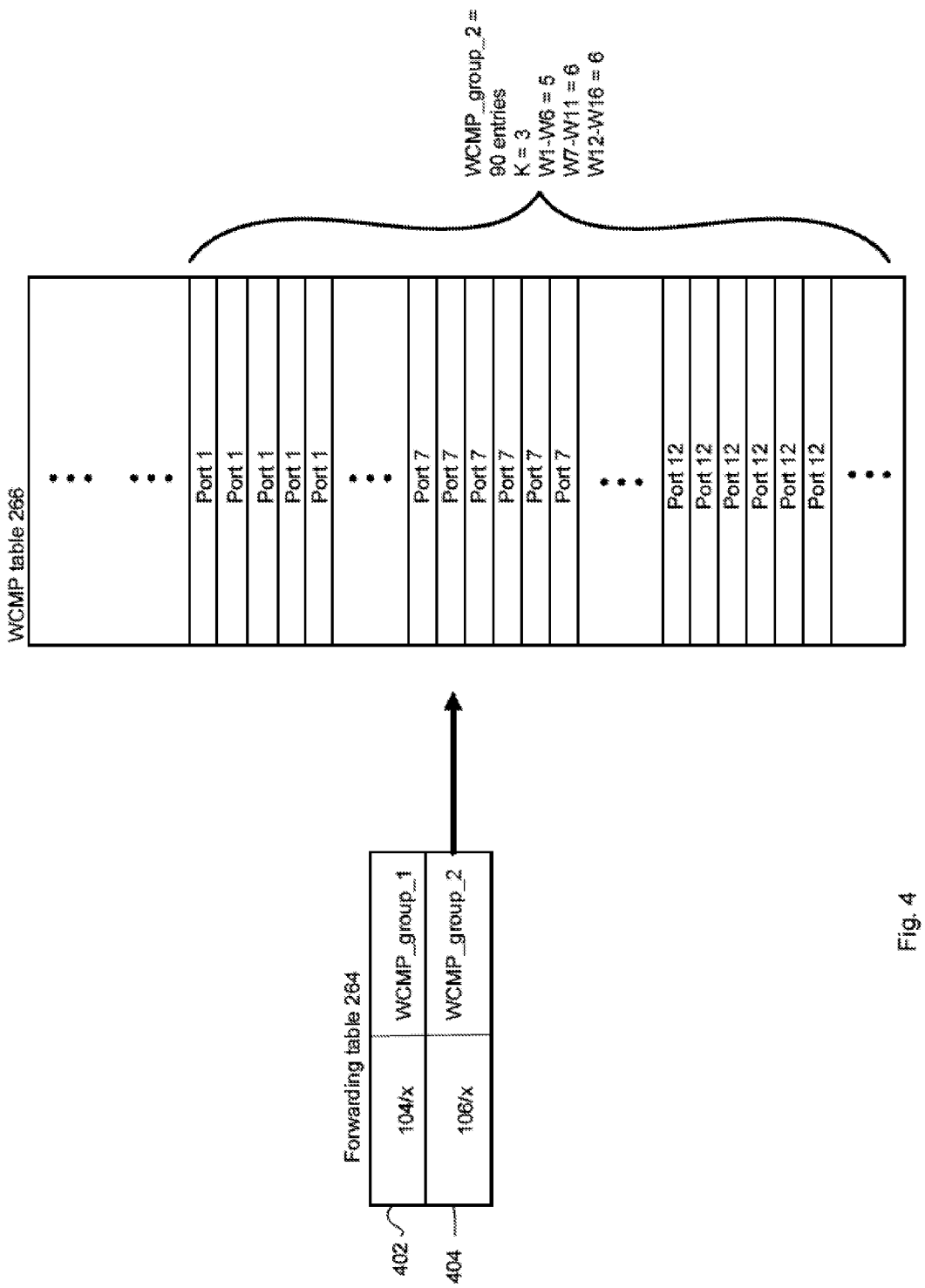
FIG. 4 is an example of switch tables according to aspects of the technology.

The weighting of the flows may be managed, for example, using the forwarding table 264 and the WCMP table 266. FIG. 4 illustrates an example of the forwarding table 264 and the WCMP table 266. The forwarding table 264 may include a number of entries 402, 404, each entry having a key and an action. The key may comprise a number of bits representing, for example, a destination address. The action may comprise information representing a next hop for packets received matching the key. The WCMP table 266 may include a plurality of entries, with each entry identifying a port of the switch 112 through which received packets may be forwarded. The number of entries listing a particular port may vary depending on a weight assigned to that port. For example, the links in the connection 132 coupled to ports 1-6 of the switch 112 were assigned a weight of five, as discussed above in connection with FIG. 3. Accordingly, each of ports 1-6 may have five entries in the WCMP table 266. Similarly, the five links in the connection 134 coupled to the ports 7-11 of the switch 112 were assigned a weight of 6. Therefore, each of the ports 7-11 may have 6 corresponding entries in the WCMP table 266.

As illustrated in FIG. 4, WCMP groups may be implemented in a table, such as WCMP table 266. Each WCMP group may comprise weights assigned to the ports of a given Tier 1 switch for a distribution of data to the plurality of Tier 2 switches. According to one example, the weights may correspond to a number of entries in the table. The WCMP table 266 may be an Equal Cost Multi-Path (ECMP) table of a switch chip hardware, with entries arranged to effect WCMP flow distribution. Each WCMP group may be stored in a contiguous block of entries in the table, with its base index referenced by the forwarding rules. Traffic matching these forwarding rules may be spread among the member egress ports of referenced WCMP group. Replication of member ports may serve to implement weighted distribution of traffic in the WCMP group. Using FIG. 3 as an example, traffic matching a destination IP for the switch 116 may be distributed among ports 1-6, ports 7-11, and ports 12-16 with weights of 5, 6, and 6, respectively. Accordingly, as shown in FIG. 4, wcmp_group_2 of size 90 (e.g., (6 ports (1-6)*weight of 5)+(5 ports (7-11)*weight of 6)+(5 ports (12-16)*weight of 6)=30+30+30=90) may be created in the WCMP table 266.

Given a typical network architecture (e.g., a CLOS network) having a number L of Tier 1 switches, each Tier 1 switch may need to set up a maximum of (L−1) WCMP groups. As discussed above in connection with FIG. 4, a WCMP group may include a plurality of weights assigned to different egress ports of the switch, the weights representing an amount of data flow to distribute over links associated with those egress ports to a given destination. Accordingly, an aggregate size of WCMP groups required in the worst case for large scale typical networks may be much higher than the size of ECMP table entries in the switch. To reduce a number of required WCMP groups, the Tier 1 switches may be subset into Q groups, where the switches in each group exhibit identical connection patterns to Tier 2 switches. Using this strategy, a given Tier 1 switch may only require one WCMP group for traffic destined to any Tier 1 switches in the same group.

The groupings of Tier 1 switches may be determined using the following equations. Each Tier 1 switch may be connected to a Tier 2 switch via either p or p+1 links. p=floor(D/L), wherein L is a number of Tier 1 switches and D is a number of downlinks per Tier 2 switch. Each Tier 1 switch may be connected to M Tier 2 switches with non-minimal connectivity (e.g., p+1 links). M may be expressed as:

$$M=N-(p*K);$$

wherein K is a number of Tier 2 switches, and N is a number of uplinks per Tier 1 switch. For each Tier 2 switch, W Tier 1 switches may have non-minimal connectivity (e.g., p+1 links). W may be expressed as:

$$W=D-(L*p)$$

Tier 1 switches in the same group may have either p or p+1 links to the same subset of Tier 2 switches (for one subset, all Tier 1 switches will have p links and for the other subset, all Tier 1 switches may have p+1 links). Hence:

$$W\_o=\min(L-W,W)$$

The maximum number of Tier 2 switches with either p or p+1 links to the same set of Tier 1 switches may be:

$$M\_o=\min(N-M,M)$$

The value of Q can be subsequently derived using W_o and L. The value of Q may vary based on whether L % W_o=0. For example, if L % W_o=0, then Q=L/W_o. However, if L % W_o !=0, then Q=((L/W_o)−1)+((L % W_o)+W_o).

In the case where L % W_o=0, L Tier 1 switches may be divided into Q=L/W_o groups, each of which consists of W_o Tier 1 switches with identical connection patterns to Tier 2 switches. Each Tier 1 switch in the group_i (i<L/W_o) may have minimal or non-minimal connectivity to the ith set of contiguous M_o Tier 2 switches. For example, a given Tier 1 switch in the group_i may have minimal connectivity when W_o !=W, but may have non-minimal connectivity when W_o=W.

In the case where L % W_o !=0, among the set of L Tier 1 switches, (L−L % W_o−W_o) Tier 1 switches may be divided into (L/W_o−1) groups, each of which consists of W_o Tier 1 switches with identical connection patterns to Tier 2 switches. Each Tier 1 switch in group_i (i<L/W_o−1) may have minimal connectivity or non-minimal connectivity to the ith set of contiguous M_o Tier 2 switches. For example, when W_o !=W, a given Tier 1 switch may have minimum connectivity, while when W_o=W the Tier 1 switch may have non-minimal connectivity. Each of the remaining (L % W_o+W_o) Tier 1 switches has a unique connection pattern to Tier 2 switches, and thus cannot be grouped with any other Tier 1 switches. (i+1)th W_o=W 1 switch in this set has minimal (when W_o !=W) or nonminimal (when W_o=W) connectivity to a set of contiguous M_o Tier 2 switches that's shifted by 1 from ith Tier 1 switch.

The pseudo code for the proposed striping strategy follows:
C[i][j]: The number of uplinks from S1_j to S2_j; i<L and j<K
//Initialize the default value of C[switch_id][spine]
For switch_id in [0 to L)
For spine in [0 to K)
IF W_o==W
C[switch_id][spine]=p;
Else
C[switch_id][spine]=p+1;

```
//Calculate the number of groups. Each group consists of
W_o switches with symmetric
//connectivity to the spines
group_size=W_o;
spine_set_size=M_o;
IF (L % W_o)
num_group=L/W_o-1;
Else
num_group=L/W_o;
//Calculate the spine connectivities of each group of W_o S1
switches
For group_id in [0, num_group)
//Calculate the spine connectivities of 1 group of S1 switches
For      switch_id      in      [group_id*group_size,
group_id*group_size+group_size)
//Each S1 switch in the group has non-minimal (if W_o==W)
or minimal
//connectivity to a set of contiguous M_o spines
For      spine     in      [group_id*spine_set_size,
group_id*spine_set_size+spine_set_size)
IF (W_o==W)
C[switch_id][spine]=p+1;
Else
C[switch_id][spine]=p;
//Calculate the spine connectivities of each of last (L % W_o+
W_o) switches
initial_spine_offset=0
For switch in [num_group*group_size, L)
//The switch has non-minimal (if W_o==W) or minimal con-
nectivity to spines of
//index range
//[spine_set_size*num_group+initial_spine_offset,
//spine_set_size*num_group+initial_spine_offset+
spine_set_size]
For shift in [0, spine_set_size)
spine=spine_set_size*num_group+initial_spine_offset+
shift;
IF (W_o==W)
C[switch_id][spine]=p+1;
Else
C[switch_id][spine]=p;
//Shift the initial offset of spine by 1 for the next switch;
initial_spine_offset++;
```

Figure 5:
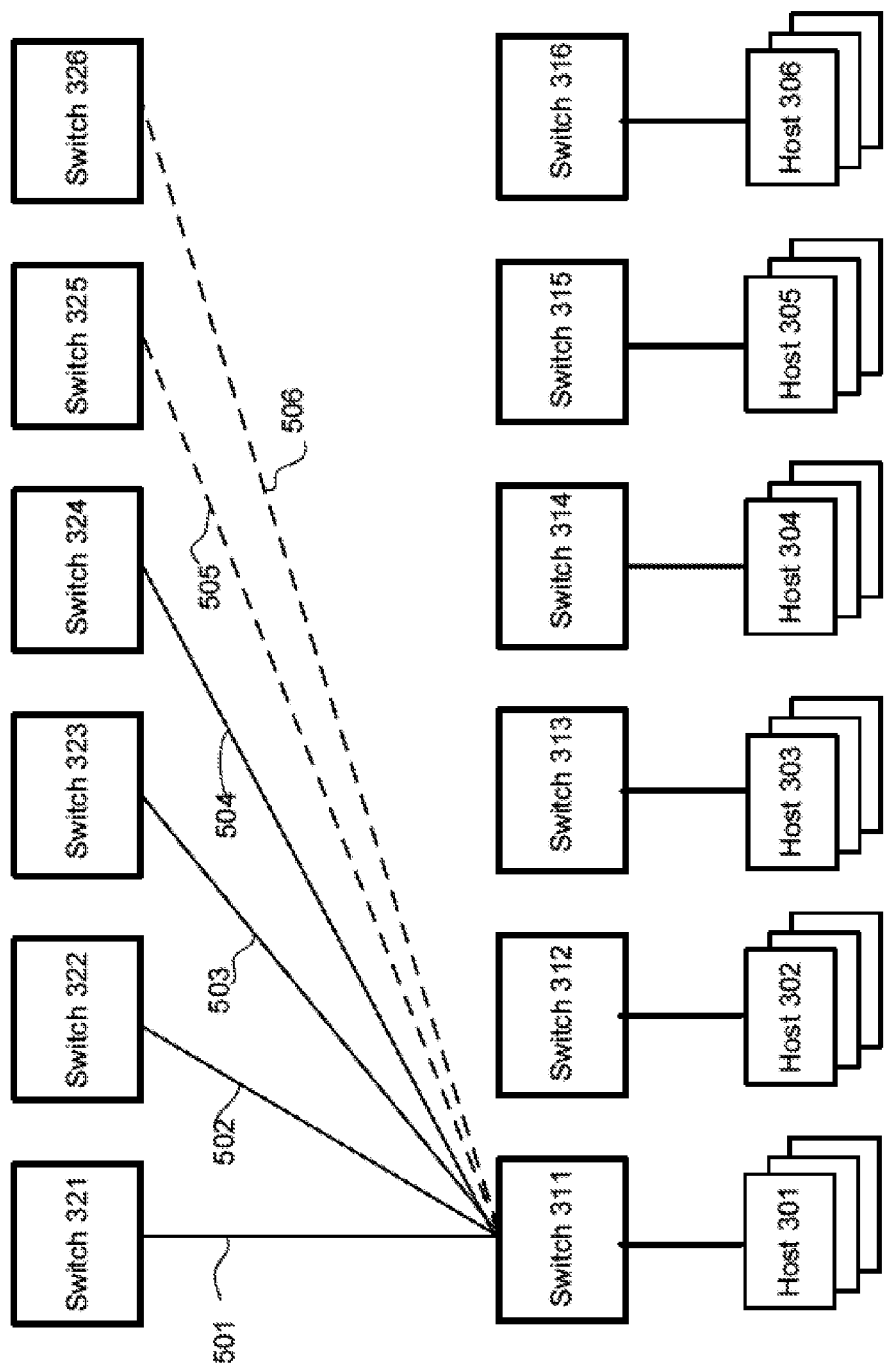
FIG. 5 is an example of striping for a given switch according to aspects of the technology.

FIGS. 5-8 illustrate groupings of Tier 1 switches and striping according to aspects of the technology. As shown in FIG. 5, a striping pattern for switch 311 may be established. For example, connections 501-504 may link the switch 311 to switches 321-324, respectively. Each of the connections 501-504 may comprise multiple links (e.g., a bundle of 3 links). Connections 505-506 may link the switch 311 to switches 325-326, respectively. These connections 505-506 may also comprise multiple links (e.g., 2 links), but may differ from the connections 501-504 with respect to the number of links.

Figure 6:
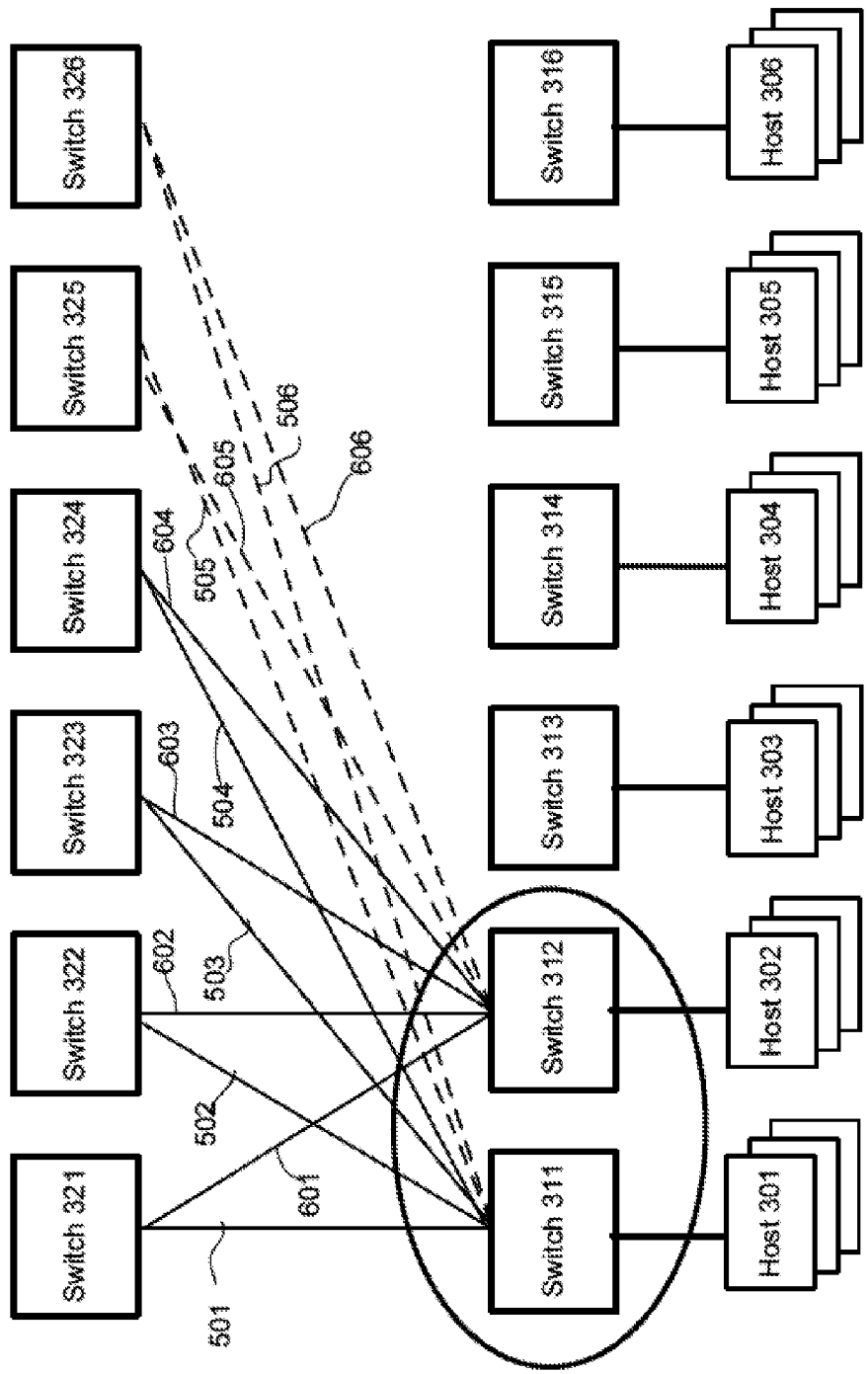
FIG. 6 is an example of determining a network configuration according to aspects of the technology.

As shown in FIG. 6, it may be determined how many other Tier 1 switches can be linked to the Tier 2 switches using the same striping pattern as the switch 311. For example, it may be determined that the switch 312 may be linked to each of the Tier 2 switches 321-326 in the same configuration as the switch 311. According to this example, connections 601-604 may link the switch 312 to the switches 321-324, and may each comprise multiple (e.g., 3) links. Connections 605-606 may link the switch 312 to the switches 325-326, and may each comprise a different number (e.g., 2) of links than the connections 601-604. Using such configuration, any flows exchanged between the switch 311 and the switch 312 should experience near 100% throughput. For example, if packets are transmitted from the switch 311 to the switch 312 through the second tier switch 321, the packets may utilize the full 3-link bandwidth of connection 501 up to the switch 321, and utilize the full 3-link bandwidth of the connection 601 down to the switch 312. Because the bandwidth of the links 501 and 601 is the same, bottlenecking problems at the switch 321 should be reduced or eliminated. The same would hold true for the remaining Tier 2 switches 322-326, because each of these switches 322-326 include the same number of links to the switches 311-312.

It may not be possible to configure each of the Tier switches 312-316 to have the same wiring configuration (striping pattern) as the switch 311. For example, if each Tier 1 switch 311-316 included a 3-link connection to switch 321, but only a 2-link connection to switch 325, the switch 321 may become overloaded. Moreover, the switch 325 may not be fully connected, and may thus have unused downlink ports and capacity. Accordingly, the Tier 1 switches may be grouped into a plurality of groups, such that the switches in each group have the same wiring configuration as the other switches in that group, but not necessarily the same wiring configuration as switches in other groups.

Figure 7:
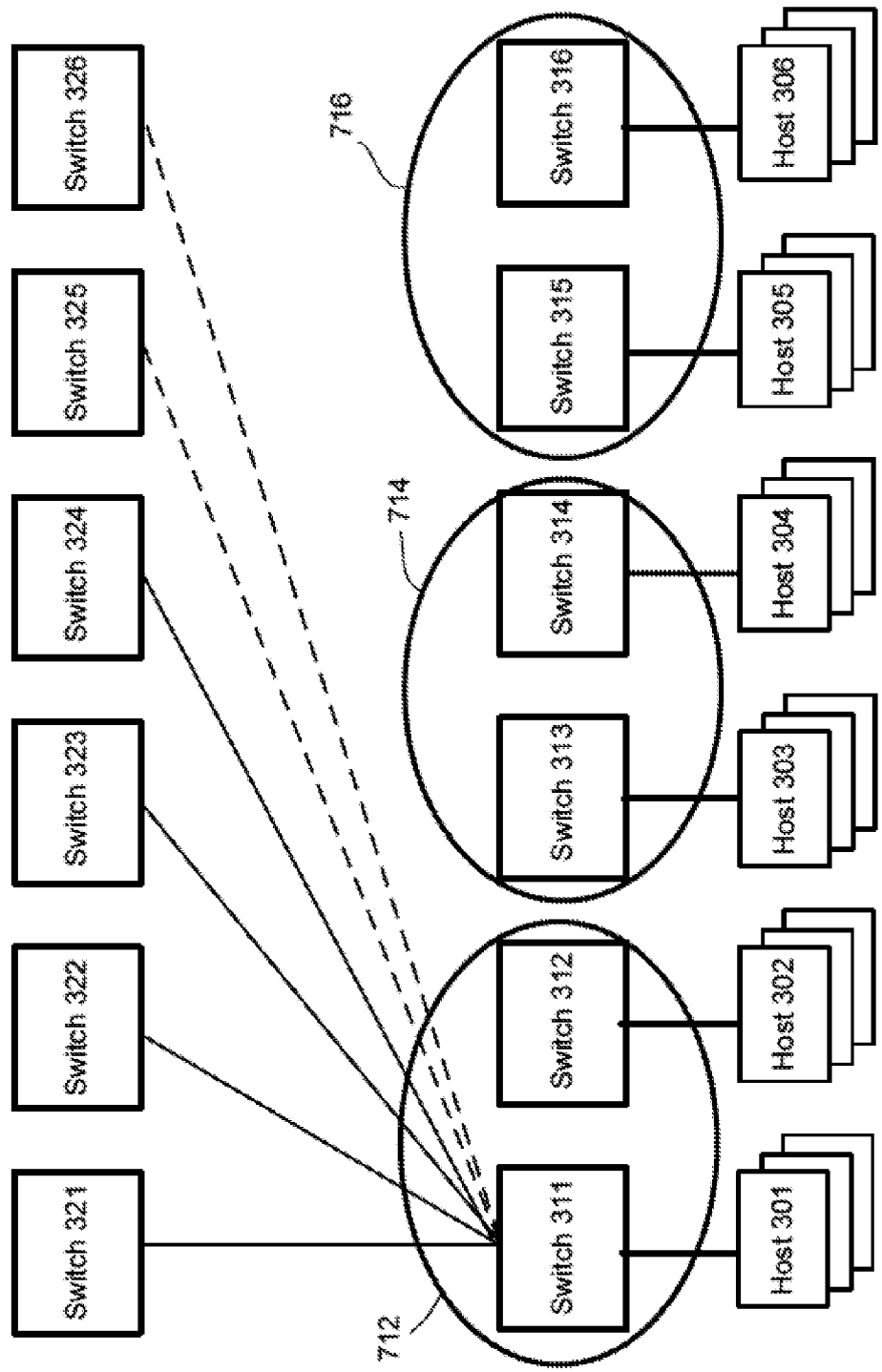
FIG. 7 is a further example of determining a network configuration according to aspects of the technology.

As shown in FIG. 7, the Tier 1 switches 311-316 may be divided into groups 712, 714, 716. In each group 712-716, the switches therein may include the same wiring configuration to the Tier 2 switches 321-326. Thus, for example, the switch 313 and the switch 314 may each include a first number of links to particular Tier 2 switches, and a second number of links to the other Tier 2 switches. While the groups 712-716 are each shown as including two member switches, it should be understood that the groups 712-716 may include any number of switches (e.g., depending on the number of Tier 1 switches, the number of Tier 2 switches, the number of uplink ports at each Tier 1 switch, the number of downlink ports at each Tier 2 switch, etc.). Similarly, while three groups 712-716 are shown, it should be understood that any number of groups may be formed.

Figure 8:
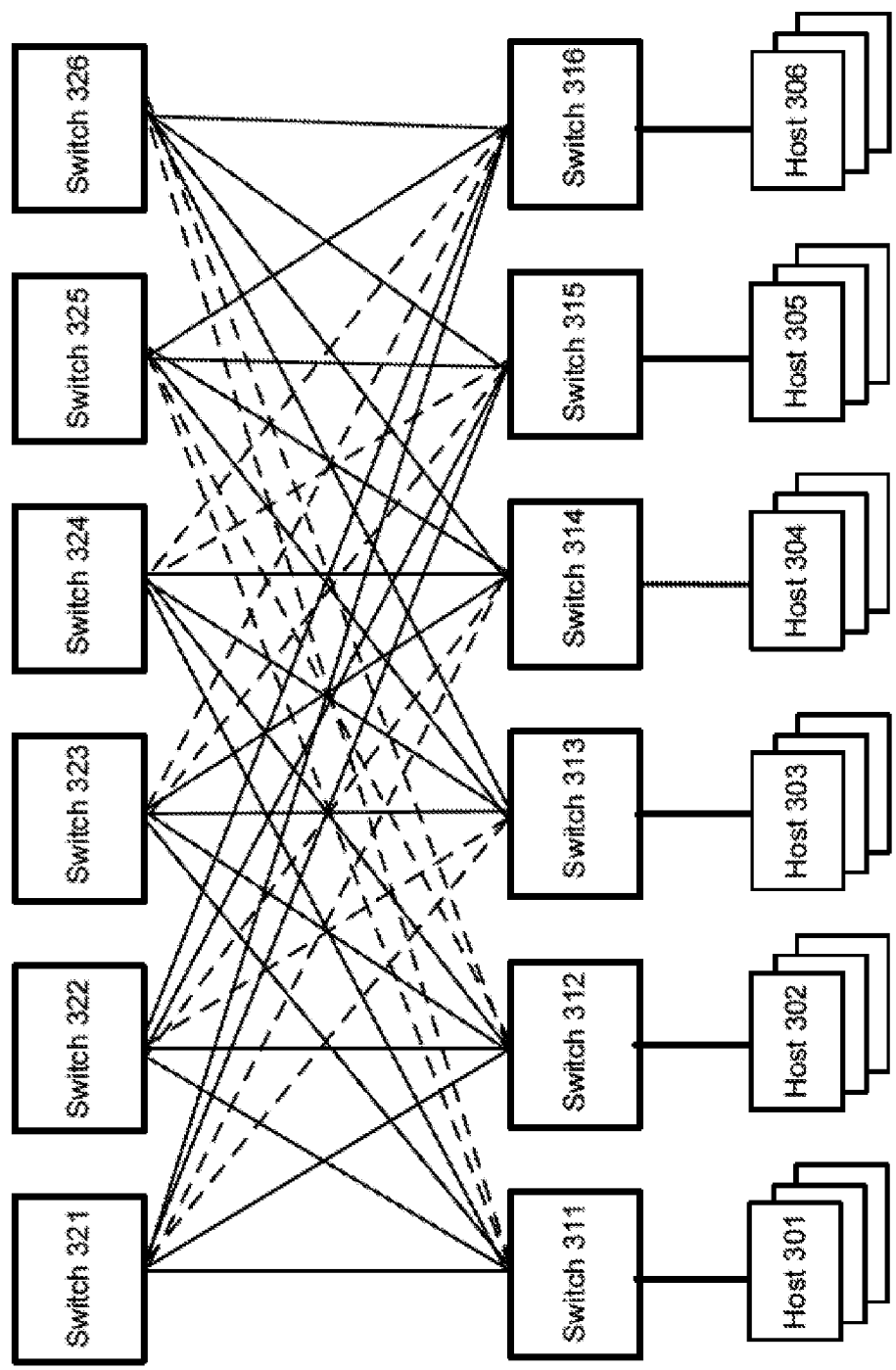
FIG. 8 is an example of a network configuration according to the example of FIG. 5.

FIG. 8 illustrates an example of connectivity of the Tier 1 switches 311-316 as grouped in FIG. 7. The switches 311-312 (group 712) include a first number (e.g., 3) of links to the Tier 2 switches 321-324 and a second number (e.g., 2) of links to the switches 325-326. The switches 313-314 (group 714) include the first number of links to the Tier 2 switches 323-326 and the second number of links to the Tier 2 switches 321-322. The switches 315-316 (group 716) include the first number of links to the Tier 2 switches 321-322, 325-326 and the second number of links to the switches 323-324. As such, each of the Tier 1 switches 311-316 include the same number (e.g., 16) of uplinks to Tier 2. Similarly, each of the Tier 2 switches 321-326 include the same number of downlinks (e.g., 16) to Tier 1. Moreover, any given Tier 2 switch 321-326 has the same wiring configuration to one member of one group as to the other member in that same group.

Since the switch 311 and the switch 312 have identical connection patterns to all Tier 2 switches 321-326, the traffic among them can be evenly spread among their uplinks to the Tier 2 switches 321-326, and there is no oversubscription for such traffic. For other traffic (e.g., for traffic to the switches 313-316), the switches 311 or 312 may set up two WCMP groups: one for traffic destined to hosts 303-304 attached to switches 313-314, and one for hosts 305-306 attached to switches 315-316.

In some instances, it may not be possible to fit every Tier 1 switch into a particular group. For example, depending on the number of Tier 1 switches, Tier 2 switches, and uplink ports on the Tier 1 switches, one or more Tier 1 switches may have a wiring configuration which is unique to the other Tier 1 switches. In such instances, other routing techniques (e.g., Weighted Cost Multi-Path flow distribution) may be employed to increase throughput among the ungrouped Tier 1 switches.

While the wiring configuration described with respect to FIG. 8 may result in near perfect throughput for flows exchanged among members of the same group, flows exchanged with members outside that group may experience decreased throughput. For example, flows transmitted from the switch 311 to the switch 315 through Tier 2 switch 324 may utilize a greater bandwidth (e.g., 3 links) on the way up to the switch 324 than on the way back down (e.g., 2 links). As such, bottlenecking and packet dropping may occur. Other routing techniques, such as WCMP, may be used to alleviate these problems. Moreover, the hosts 301-306 coupled to the Tier 1 switches 311-316 may be arranged such that hosts that communicate with each other more frequently are coupled to switches in the same group. For example, if the host 301 is used for a particular application, service, or program that communicates with the host 302 more frequently than the other hosts 303-306, then the hosts 301-302 may be coupled to switches (e.g., switches 311, 312) in the same group.

Figure 9:
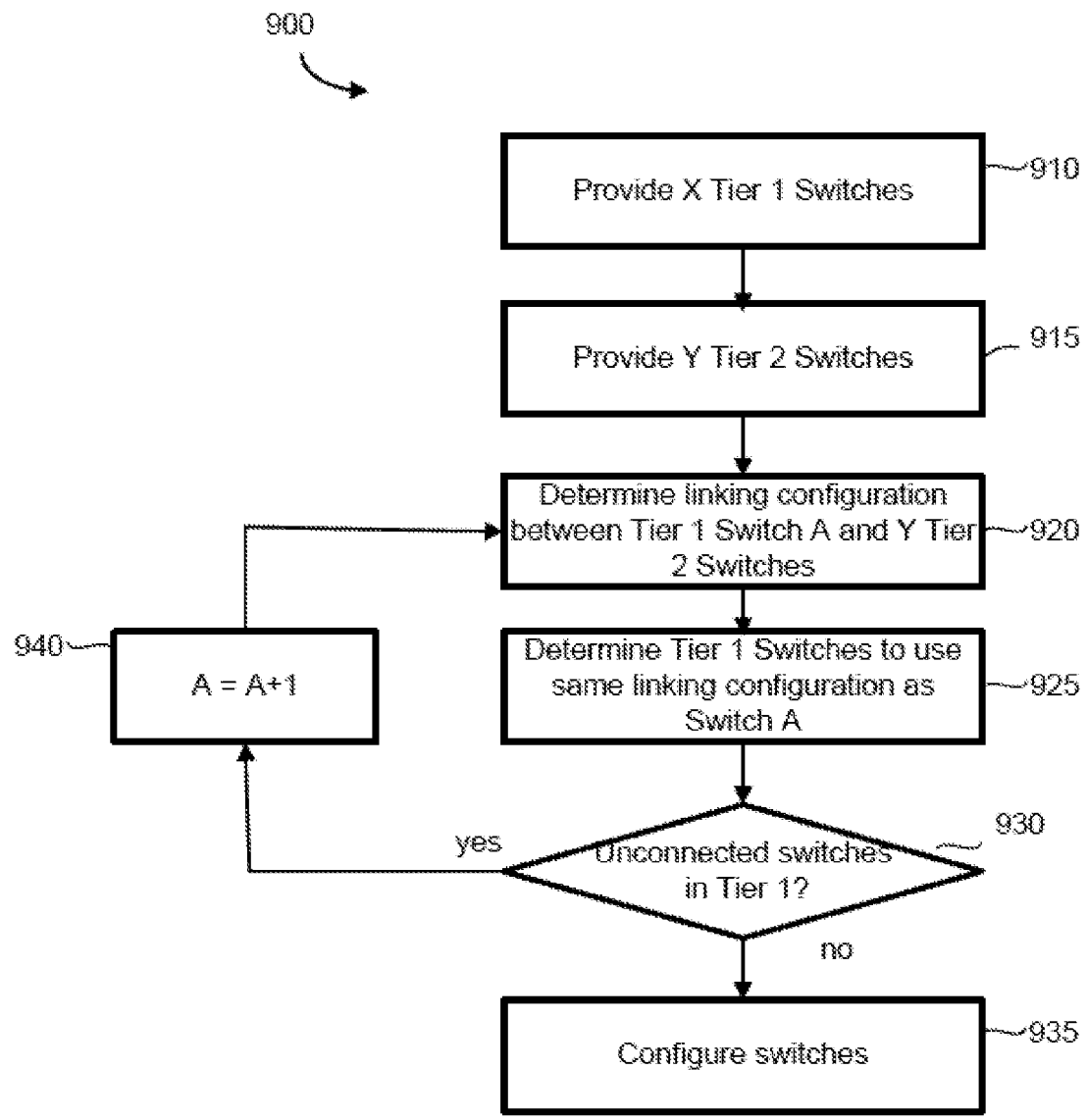
FIG. 9 is a flow diagram illustrating a method according to aspects of the technology.

FIG. 9 is a flow diagram illustrating a method according to aspects of the technology. According to this method 900, first and second tier switches are provided and a linking configuration is determined therefore, where the first tier switches are linked in groups. The method 900 is only one example of how such a linking configuration may be determined. While the description below refers to a number of blocks of the method 900 in a particular order, it should be understood that the order in which the blocks are performed may be modified, and blocks may be added or omitted.

In block 910, a number X of Tier 1 switches is provided. The Tier 1 switches may be any type of switches used for routing data, e.g., through a data center, WAN, LAN, or any other type of network. Alternatively, the Tier 1 switches may be on-chip switches. According to one aspect, each of the X Tier 1 switches may be of a same type. Each of the X Tier 1 switches may include a predetermined number of data ports, for example, for downlink communications with a host device or uplink communications with another switch.

In block 915, a number Y of Tier 2 switches is provided. The number Y may be the same or different than the number X. Similarly, the Tier 2 switches may be of the same or different types as the Tier 1 switches. For example, according to some aspects, the Tier 2 switches may be a higher capacity than the Tier 1 switches, and fewer Tier 2 switches may be used. Each of the Y Tier 2 switches may include a predetermined number of ports (e.g., downlink ports to Tier 1 switches, uplink ports to further devices, etc.).

In block 920, a linking configuration between a first switch A of the X Tier 1 switches and each of the Y Tier 2 switches is determined. For example, a connection between the switch A and each Tier 2 switch may be established, wherein each connection comprises one or more links. The number of links in each connection may vary, for example, depending on a number of uplink ports in the switch A and the number Y of Tier 2 switches. For example, referring back to FIG. 5, the switch 311 may include 16 uplinks ports, and therefore may be able to establish 3-link connections 501-504 to the switches 321-324, but only 2-link connections 505-506 to the switches 325-326.

In block 925, it may be determined whether any of the other Tier 1 switches (e.g., X-A) may utilize the same linking configuration as the switch A. For example, it may be determined whether and how many other Tier 1 switches may establish the same number of links to each of the Y Tier 2 switches as the switch A. Thus, it may be determined which Tier 1 switches to place in the same group as the switch A. According to some aspects, it may first be determined how many groups should be formed from the X Tier 1 switches, and the groups may thereafter be populated.

In block 930, it is determined whether any of the X Tier 1 switches remain unconnected to Tier 2. If this is the case, the method 900 proceeds to block 940, where a next Tier switch is considered. The blocks 920-925 where linking configurations are determined may be repeated for this next Tier 1 switch. Each Tier 1 switch may be considered until it is determined at block 930 that each Tier 1 switch is connected to Tier 2.

At block 935, the Tier 1 and Tier 2 switches may be configured. For example, the determined linking configurations may be implemented, forwarding tables and WCMP tables for the switches may be entered, hosts may be coupled to the Tier 1 switches, etc.

The above-described aspects of the technology may be advantageous in increasing throughput and speed in a multi-stage network, while keeping down costs and materials. With the proposed striping strategy, a given Tier 1 switch only needs to establish one WCMP group for any traffic destined to other Tier 1 switches in the same group. Because Tier 1 switches in the same group have identical connectivity to all connected Tier 2 switches, the maximum number of WCMP groups required on any Tier 1 switch is reduced from L−1 (where L is the number of Tier 1 switches) to Q−1 (where Q is the number of groups). The proposed striping further eliminates oversubscription among the Tier 1 switches in the same group because all switches in the same group have identical connection patterns to the next stage of switching. Network throughput may be further improved by placing the Tier 1 switches with heavy traffic demand in the same group, especially when there is flexibility in the underlying topology.

Although the present invention has been described with reference to particular embodiments, it should be understood that these examples are merely illustrative of the principles and applications of the present invention. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments. However, these and that other arrangements may be devised without departing from the spirit and scope of the present invention as defined by the appended claims.

The invention claimed is:

1. A method comprising:
   connecting, using one or more processors, a plurality of first tier switches with a plurality of second tier switches arranged hierarchically above the plurality of first tier switches, each of the first tier switches having a plurality of egress ports;
   determining, using the one or more processors and a forwarding table, a weight for each connection between a given first tier switch and a given second tier switch;
   storing, using the one or more processors, a number of entries in association with a given weighted cost multi-path (WCMP) group in a WCMP table corresponding to the weight for each connection; and
   performing, using the one or more processors, weighted distribution of traffic between the plurality of first tier switches and the plurality of second tier switches based on the table.

2. The method of claim 1, wherein the forwarding table comprises a number of entries, each entry having a key and an action.

3. The method of claim 1, wherein the WCMP table comprises a number of entries, each entry identifying a port of a given switch through which packets may be forwarded.

4. The method of claim 3, wherein the number of entries associated with a port depends on the weight for each connection coupled to the port.

5. The method of claim 1, wherein the WCMP table is an Equal Cost Multi-Path table of a switch chip hardware, with entries arranged to effect WCMP flow distribution.

6. The method of claim 1, wherein the entries associated with a given WCMP group are stored in a contiguous block of entries in the WCMP table, the contiguous block of entries having a base index.

7. The method of claim 6, wherein performing weighted distribution of traffic further comprises sending traffic along ports in a WCMP group when the traffic matches forwarding rules that reference a base index of a block of entries associated with the WCMP group.

8. The method of claim 1, wherein each WMCP group comprises a plurality of weights assigned to different egress ports of the first tier switches.

9. The method of claim 1, wherein the first tier switches having the same connection patterns to second tier switches are grouped in a same grouping.

10. The method of claim 9, wherein performing weighted distribution of traffic further comprises using a single WCMP group for traffic destined to a first tier switch in the same grouping as a source first tier switch.

11. The method of claim 1, wherein connecting the plurality of first tier switches with the plurality of second tier switches further comprises, for each first tier switch, determining a proposed linking configuration to each of the plurality of second tier switches, wherein the linking configuration is based at least in part on a number of egress ports in a given first tier switch and a number of second tier switches.

12. The method of claim 1, wherein a number of connections between each pair of first tier switch and second tier switch is one or more, wherein a first number of connections between a first pair is not equal to a second number of connections between a second pair.

13. A system comprising:
a plurality of first tier switches, each of the first tier switches having a plurality of egress ports;
a plurality of second tier switches arranged hierarchically above the plurality of first tier switches;
a memory that stores a forwarding table and a weight cost multi-path (WCMP) table; and
one or more processors configured to:
  connect the plurality of first tier switches with the plurality of second tier switches;
  determine, using the forwarding table, a weight for each connection between a given first tier switch and a given second tier switch;
  store a number of entries in association with a given WCMP group in the WCMP table corresponding to the weight for each connection; and
  perform weighted distribution of traffic between the plurality of first tier switches and the plurality of second tier switches based on the table.

14. The system of claim 13, wherein the forwarding table comprises a number of entries, each entry having a key and an action.

15. The system of claim 13, wherein the WCMP table comprises a number of entries, each entry identifying a port of a given switch through which packets may be forwarded.

16. The system of claim 5, wherein the number of entries associated with a port depends on the weight for each connection coupled to the port.

17. The system of claim 13, wherein the WCMP table is an Equal Cost Multi-Path table of a switch chip hardware, with entries arranged to effect WCMP flow distribution.

18. The system of claim 13, wherein the entries associated with a given WCMP group are stored in a contiguous block of entries in the WCMP table, the contiguous block of entries having a base index.

19. The system of claim 18, wherein the one or more processors are further configured to perform weighted distribution of traffic by sending traffic along ports in a WCMP group when the traffic matches forwarding rules that reference a base index of a block of entries associated with the WCMP group.

20. A non-transitory, tangible computer-readable storage medium on which computer readable instructions of a program are stored, the instructions, when executed by one or more computing devices, cause the one or more computing devices to perform a method, the method comprising:
connecting a plurality of first tier switches with a plurality of second tier switches arranged hierarchically above the plurality of first tier switches, each of the first tier switches having a plurality of egress ports;
determining, using a forwarding table, a weight for each connection between a given first tier switch and a given second tier switch;
storing a number of entries in association with a given weighted cost multi-path (WCMP) group in a WCMP table corresponding to the weight for each connection; and
performing weighted distribution of traffic between the plurality of first tier switches and the plurality of second tier switches based on the table.

* * * * *